United States Patent Office 3,823,189
Patented July 9, 1974

3,823,189
DERIVATIVES OF 3-AMINO-2-HALO-
2-CYCLOHEXEN-1-ONE
Ivo L. Jirkovsky, Montreal, Quebec, Canada, assignor to American Home Products Corporation, New York, N.Y.
No Drawing. Filed Jan. 14, 1972, Ser. No. 217,958
Int. Cl. C07c 97/06
U.S. Cl. 260—577
2 Claims

ABSTRACT OF THE DISCLOSURE

Enaminoketones characterized by having an amino, arylamino or aryl(lower)alkylamino radical attached to position 3 of a 2-halo-2-cyclohexen-1-one with optional di(lower)alkyl groups at position 5 are disclosed. The compounds are useful antibacterial and antifungal agents. Methods for their preparation and use are also disclosed.

BACKGROUND OF THE INVENTION

(1) Field of the Invention

This invention relates to enaminoketones. More particularly, this invention relates to 3-amino-2-halo-2-cyclohexen-1-ones, to processes for their preparation and to intermediates used in the process.

The enaminoketones of this invention possess valuable antibacterial and antifungal properties. Furthermore, they possess a low order of toxicity. These properties render the compounds of the invention useful as therapeutics for the control of infectious disease and as active ingredients for antiseptic preparations.

(2) Description of the Prior Art

Previously disclosed compounds related to the compounds of the present invention are exemplified by 3-amino-2-cyclohexen-1-one, F. Zymalkowski and J. Rimek, Naturwissenschaften, 47, 83 (1960) and 2-bromo-4,4-dimethyl-2-cyclohexen-1-one, F. G. Bordwell and K. M. Wellman, J. Org. Chem., 28, 2544 (1963). Interest in such compounds stemmed from their use as reactive intermediates and their spectroscopic properties. The fact that the compounds of the present invention have both a halo and an amino substituent at positions 2 and 3, respectively, readily distinguished the present compounds from such compounds of the prior art.

A class of 2-cyclohexen-1-ones having a halo and an amino substituent at positions 2 and 3, respectively, have been reported, E. E. Gilbert and B. Veldhuis, Belgian Patent No. 664,983 (Oct. 1, 1965). This class is exemplified by the compound, 2-chloro-3-(p-chloroanilino)-4,4,5,5,6,6-hexafluoro - 2 - cyclohexen-1-one. Such compounds are readily distinguished from the compounds of the present invention by the fact that the 2-cyclohexen-1-one nucleus of these prior art compounds is fully substituted and that the toxic properties of these compounds to insects render them useful as insecticides rather than therapeutics or antiseptic agents.

SUMMARY OF THE INVENTION

The enaminoketones of this invention are characterized by having an amino, arylamino or aryl(lower)alkylamino radical attached to position 3 of a 2-halo-2-cyclohexen-1-one with one or two optional alkyl groups at position 5.

A preferred class of the enaminoketones of this invention have the formula I:

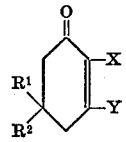

I in which $R^1$ and $R^2$ both are hydrogen or lower alkyl; X is selected from the group consisting of chlorine, bromine and iodine and Y is emino or $NH(CH_2)_nR^3$ wherein n is an integer from 0 to 2 and $R^3$ is a radical selected from the group consisting of

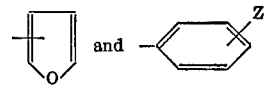

in which Z is hydrogen, halo or trifluoromethyl.

The enaminoketones of formula I in which Y is $NH(CH_2)_nR^3$ as defined in the first instance are prepared by treating the corresponding compound of formula II

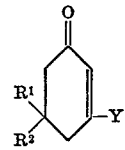

II in which Y is as described above with a suitable reagent capable of furnishing positive halogen.

The enaminoketones of formula I in which Y is amino are prepared by treating the corresponding enaminoketone of formula I in which Y is benzylamino with a mineral acid.

Detailed Description of the Invention

The term "lower alkyl" as used herein contemplates both straight and branched chain alkyl radicals containing from one to six carbon atoms and includes methyl, ethyl, propyl, isopropyl, butyl, isobutyl, 2-methylpentyl and the like.

The term "halo" as used herein contemplates halogens and includes chlorine, bromine and iodine.

Antibacterial and Antifungal Activity

The compounds of this invention exhibit utility as antibacterial agents against a number of gram-positive and gram-negative microorganisms, such as, Staphylococcus pyogenes, both penicillin sensitive and penicillin resistant, Streptococcus faecalis, Escherichia coli, Aerobacter aerogenes, Salmonella pullorum, Pseudomonas aerugenosa, Proteus mirabilis, Proteusvulgaris, Klebsiella pneumoniae and Serratia marcescens and as antifungal agents against a number of pathogenic fungi such as, Candida albicans, Microsporum gypseum and Trichophyton granulosum, in standard tests for antibacterial and antifungal activity, such as those described in "Antiseptics, Disinfectants, Fungicides and Sterilization," G. F. Reddish, Ed., 2nd. ed., Lea and Febiger, Philadelphia, 1957 or by D. C. Grove and W. A. Randall in "Assay Methods of Antibiotics," Med. Encycl. Inc., New York, 1955.

When the compounds of this invention are employed as antibiotic or antifungal agents in warm-blooded animals, e.g. rats, they may be administered alone or in combination with pharmacologically acceptable carriers. The proportion of the compound is determined by the solubility and chemical nature of the compound, chosen route of administration and standard biological practice. For example, they may be administered orally in solid from containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents as antibiotic or antifungal agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford antibacterially or antifungally effective results without causing any harmful or deleterious side effects and preferably at a level that is in a range of from about 10 mg. to about 1000 mg. per kilo per day, although as aforementioned, variations will occur. However, a dosage level that is in the range of from about 50 mg. to about 500 mg. per kilo per day is most desirably employed in order to achieve effective results.

In addition, the agents may be employed topically. For topical application they may be formulated in the form of solutions, creams, or lotions in pharmaceutically acceptable vehicles containing 0.1–5 percent, preferably 2 percent, by weight of the agent and may be administered topically to the infected area of the skin.

Also the antibacterial properties of the compounds of this invention may be utilized for washing equipment in hospitals, homes and farms, instruments used in medicine and bacteriology, clothing used in bacteriological laboratories, and floors, walls and ceiling in rooms in which a background free of Gram-positive and Gram-negative microorganisms, such as those listed above, is desired. When employed in this manner the compounds of this invention may be formulated in a number of compositions comprising the active compound and an inert material. In such compositions, while the compounds of formula I of this invention may be employed in concentrations as low as 500 p.p.m., from a practical point of view, it is desirable to use from about 0.10% by weight, to about 5% by weight or more.

The formulations that may be used to prepare antiseptic wash solutions of the compounds of this invention are varied and may readily be accomplished by standard techniques, see for example, "Remington's Practice of Pharmacy," E. W. Martin et al., Eds., 12th ed., Mack Publishing Company, Easton, Penn., 1961, pp. 1121–1150. In general, the compounds may be made up in stock solutions. They can also be formulated as suspensions in an aqueous vehicle. These make useful mixtures for decontaminating premises. Also, aqueous vehicles containing emulsifying agents, such as sodium lauryl sulfate, and relatively high concentrations, e.g. up to about 5% by weight, of the compounds may be formulated by conventional techniques.

Preparation of Compounds

In practising this invention the preferred starting materials are the compounds of formula II in which Y is $NH(CH_2)_nR^3$ as defined in the first instance. The enaminoketone, 3-benzylamino-5,5-dimethyl-2-cyclohexen-1-one (II, $R^1$ and $R^2=CH_3$ and Y=benzylamino), is known and a convenient preparation for this enaminoketone from dimedone and benzylamine has been described by P. Crabbe, et al., Tetrahedron, 24, 4299 (1968). By following the procedure of Crabbe, et al., the remaining starting materials of formula II in which $R^1$, $R^2$ and Y are as described above are readily prepared. For example, treating dimedone with furfurylamine gives 5,5-dimethyl-3-furfurylamino - 2-cyclohexen-1-one and treating 1,3-cyclohexanedione with benzylamine or furfurylamine gives 3-benzylamino-2-cyclohexen-1-one and 3-furfurylamino-2-cyclohexen-1-one, respectively.

For the preparation of the enaminoketones of formula I in which Y is $NH(CH_2)_nR^3$ as defined in the first instance the corresponding starting material of formula II is treated with a molar equivalent of a suitable reagent capable of furnishing positive halogen. Preferred reagents included among those suitable for this purpose are the N-haloimides and N-haloamides, for example, N-bromosuccinimide, N-chlorosuccinimide, N-bromoacetamide and the like. Also the specific halogenating agents, cyanogen bromide, cyanogen chloride, and sulfuryl chloride, see L. F. Fieser and M. Fieser, "Reagents for Organic Synthesis," John Wiley and Sons, Inc., New York, 1967, are satisfactorily employed.

Additional preferred reagents suitable for the preparation of the enaminoketones of formula I in which Y is $NH(CH_2)_nR^3$ wherein the integer $n$ is 1 or 2 and $R^3$ is as defined in the first instance include the elementary halogens, chlorine, bromine and iodine and the interhalogen compounds, bromine monochloride, iodine monochloride and the like.

In practising the foregoing halogenation steps, a variety of solvents and reaction conditions may be used depending on the particular reagent employed.

When employing an elementary halogen or an interhalogen compound as the reagent, the reaction is normally conducted by adding a solution of one equivalent of the halogen or interhalogen compound in a halogenated hydrocarbon solvent to a solution of the appropriate starting material of formula II in a halogenated hydrocarbon solvent. Convenient halogenated hydrocarbon solvents that may be utilized in this reaction include chloroform, carbon tetrachloride, methylene dichloride, ethylene dichloride and the like. Chloroform and carbon tetrachloride are very practical and convenient solvents for this purpose. The resultant mixture is normally allowed to stand for a period of one-half to one hour at room temperature; however, any period of time from ten minutes to three hours and temperatures from 0° to 60° C. may be employed satisfactorily. Under these conditions the starting material of II in which Y is $NH(CH_2)_nR^3$ as defined in the first instance is converted to corresponding acid addition salt of the desired compound of formula I, the anion of the acid being derived from the reagent. This acid addition salt is in turn converted readily to the desired enaminoketone of formula I by treatment with a mineral acid having a stronger anion than the anion associated with the acid addition salt, for example, sulfuric acid, at temperatures from −20° to 20° C. for five to ten minutes or by simply boiling the acid addition salt with a polar solvent, for example, methanol, ethanol, dimethylformamide or tetrahydrofuran, for several minutes.

Alternatively, the starting material for formula II in which Y is $NH(CH_2)_nR^3$ as defined in the first instance is converted directly to the corresponding enaminoketones of formula I by treating the starting material of formula II with one equivalent of a N-haloimide or N-haloamide in a suitable inert solvent. In this case, the choice of inert solvent is not too critical. Aromatic hydrocarbons, for example, benzene and toluene, ethers and cyclic ethers, for example, diethyl ether and tetrahydrofuran, halogenated hydrocarbons as described above, or lower alkanols, for example, methanol or ethanol may be utilized. Water may be present in the reaction mixture and in this respect the use of methanol-water (9:1) has been found to be a convient and efficacious solvent for this reaction. Any temperature from 0° to 60° C. is satisfactory for conducting the reaction; however, room temperature is most convenient since at this temperature the reaction is usually complete within one-half to one hour.

Similarly, the specific halogenating agents, cyanogen bromide, cyanogen chloride and sulfuryl chloride are used in the manner described above for the N-haloimides and N-haloamides; however, the preferred solvents for use with these reagents are the aromatic hydrocarbons, for example, benzene, or the lower alkanols, for example, ethanol.

The enaminoketones of formula I in which Y is $NH_2$ are prepared directly from the corresponding enaminoketones of formula I in which Y is benzylamino. More specifically, preparation by this route is accomplished by heating the corresponding benzylamino derivatives of formula I, prepared as described above, with concentrated mineral acid at 40° to 80° C., preferably 65° C., for a period of one to two hours. Concentrated sulfuric acid is a suitable and preferred mineral acid for this purpose.

In a related aspect of this invention it has been found that enaminoketones of formula I in which X is iodo and Y is benzylamino form an unusual 4H-1,4-benzoxazine derivative when treated with dibenzoyl peroxide. For example, treatment of 3-benzylamino-5,5-dimethyl-2-iodo-2-cyclohexene-1-one with an excess of dibenzoyl peroxide in benzene solution at reflux temperature for 15 hours affords 8,8α-dihydro-5-iodo-8,8-dimethyl-2,3-diphenyl-4H-1,4-benzoxazine-6,7-diol, m.p. 212–215° C.

Finally, it should be noted that treatment of the starting materials of formula II with halogenating agents under conditions different from those described herein can lead to different products. For example, by using a procedure similar to that described previously by B. Halpern and L. B. James, Aust. J. Chem., 17, 1282 (1964), halogenated diketones and not halogenated enaminoketones are obtained. In a more particular illustration of the latter procedure, titration of 3-benzylamino-5,5-dimethyl-2-cyclohexen-1-one (II, $R^1$ and $R^2$=$CH_3$ and Y=benzylamino) in aqueous tetrahydrofuran solution with bromine until a yellow coloration of the reaction mixture persists yields 2,2-dibromo-5,5-dimethyl-1,3-cyclohexanedione and benzylamine hydrobromide.

The following examples illustrate further this invention.

EXAMPLE 1

2 - Bromo-3-(α,α,α-trifluoro-m-toluidino)-2-cyclohexen-1-one (I: $R^1$ and $R^2$=H, X=Br and Y=α,α,α-trifluoro-m-toluidino)

The starting material of formula II, 3-(α,α,α-trifluoro-m-toluidino)-2-cyclohexen-1-one (7.5 g., m.p. 158° C.), prepared from 1,3-cyclohexanedione and m-(trifluoromethyl)aniline according to the procedure of Crabbe, et al., cited above, is added in portions to a stirred suspension of N-bromosuccinimide (5.5 g.) in 65 ml. of methanol-water (9:1). After stirring for 1 hr. the mixture is allowed to stand overnight (16 hr.). The mixture is poured into 130 ml. of 10% sodium bicarbonate solution and extrated with chloroform. The extract is washed with water, dried ($MgSO_4$), and evaporated after filtration. Crystallization of the residue from ether-hexane and then benzene-hexane yields the title compound, m.p. 120–121° C., $\gamma_{max}^{CHCl_3}$ 3345, 1645, 1575, 1385 cm.$^{-1}$.

In the same manner but replacing N-bromosuccinimide with an equivalent amount of N-bromoacetamide, the title compound is also obtained.

In the same manner but replacing N-bromosuccinimide with an equivalent amount of N-chlorosuccinimide or N-iodosuccinimide, 2-chloro-3-(α,α,α-trifluoro-m-toluidino)-2-cyclo-hexen-1-one and 2-iodo-3-(α,α,α-trifluoro-m-toluidino)-2-cyclo-hexen-1-one are obtained, respectively.

In the same manner, but replacing 3-(α,α,α-trifluoro-m-toluidino)-2-cyclohexen-1-one with an equivalent amount of 3-furfurylamino-2-cyclohexen-1-one, m.p. 103–104° C., prepared from 1,3-cyclohexanedione and furfurylamine according to the procedure of Crabbe, et al., cited above, 2-bromo-3-furfurylamino-2-cyclohexen-1-one, m.p. 123–124° C., $\gamma_{max}^{CHCl_3}$ 3360, 1630, 1560–1570 cm.$^{-1}$, is obtained.

The procedure of Example 1 is followed to prepare other enaminoketones of formula I in which $R^1$, $R^2$ and X as defined in the first instance and Y is $NH(CH_2)_nR^3$ as defined in the first instance. Examples of such compounds are listed in Table I. In each of these examples the requisite starting material of formula II and the halogenating agent are used as starting materials in the same proportions as described for 3-(α,α,α-trifluoro-m-toluidino)-2-cyclohexen-1-one and N-bromosuccinimide in Example 1.

The requisite starting materials of formula II are prepared according to the procedure of Crabbe et al., cited above, using an appropriate amine together with either 1,3-cyclohexanedione, described by H. Stetter and W. Dierichs, Chem. Ber., 85, 61 (1952), dimedone, 5,5-diethyl-1,3-cyclohexanedione, described by G. A. R. Kon and R. P. Linstead, J. Chem. Soc., 815 (1925) and 5,5-dipropyl-1,3-cyclohexanedione, prepared from 3,3-dipropylacrylic acid [G. A. R. Kon and B. I. Narayanan, J. Chem. Soc., 15, 36 (1927)] according to the method of Kon and Linstead, cited above, for the corresponding 5,5-diethyl derivative. The appropriate amines are either well known, for example, aniline or benzylamine, or are prepared by known procedures, for example, see L. F. Fieser and M. Fieser, "Advanced Organic Chemistry," Reinhold Publishing Corp., New York, 1961, pp. 495–506 and 706–742.

TABLE I

| Example | Starting material of Formula II | | Halogenating reagent* | Product: (prefix listed below)-2-cyclohexen-1-one |
|---|---|---|---|---|
| | $R_1$ and $R_2$ | Y | | |
| 2 | H | Anilino | NBA | 3-anilino-2-bromo |
| 3 | $CH_3$ | do | NBS | 3-anilino-2-bromo-5,5-dimethyl |
| 4 | $C_2H_5$ | do | NClS | 3-anilino-2-chloro-5,5-diethyl |
| 5 | n-$C_3H_7$ | do | NClS | 3-anilino-2-chloro-5,5-dipropyl |
| 6 | H | p-Chlorobenzylamino | NClS | 2-chloro-3-(p-chlorobenzylamino) |
| 7 | $CH_3$ | o-Chlorobenzylamino | NBA | 2-bromo-3-(o-chlorobenzylamino)-5,5-dimethyl |
| 8 | $C_2H_5$ | p-Iodobenzylamino | NIS | 5,5-diethyl-2-iodo-3-(p-iodobenzylamino) |
| 9 | n-$C_3H_7$ | m-Bromobenzylamino | NBS | 2-bromo-3-(m-bromobenzylamino)-5,5-dipropyl |
| 10 | H | α,α,α-Trifluoro-m-toluidino | NClS | 2-chloro-3-(α,α,α-trifluoro-m-toluidino) |
| 11 | $CH_3$ | α,α,α-Trifluoro-p-toluidino | NBS | 2-bromo-5,5-dimethyl-3-(α,α,α-trifluoro-p-toluidino) |
| 12 | $C_2H_5$ | do | NIS | 5,5-diethyl-2-iodo-3-(α,α,α-trifluoro-p-toluidino) |
| 13 | n-$C_3H_7$ | α,α,α-Trifluoro-m-toluidino | NClS | 2-chloro-5,5-dipropyl-3-(α,α,α-trifluoro-m-toluidino) |
| 14 | H | 2-furylamino | NBS | 2-bromo-3-(2-furylamino) |
| 15 | $CH_3$ | do | NBA | 2-bromo-3-(2-furylamino)-5,5-dimethyl |
| 16 | $C_2H_5$ | 3-furylamino | NClS | 2-chloro-5,5-diethyl-3-(3-furylamino) |
| 17 | n-$C_3H_7$ | do | NBS | 2-bromo-3-(3-furylamino)-5,5-dipropyl |
| 18 | H | Benzylamino | NIS | 3-benzylamino-2-iodo |
| 19 | $CH_3$ | do | NClS | 3-benzylamino-2-chloro-5,5-dimethyl |
| 20 | $C_2H_5$ | do | NBA | 3-benzylamino-2-bromo-5,5-diethyl |
| 21 | n-$C_3H_7$ | do | NBS | 3-benzylamino-2-bromo-5,5-dipropyl |
| 22 | H | p-Fluorobenzylamino | NBA | 2-bromo-3-(p-fluorobenzylamino) |
| 23 | $CH_3$ | m-Fluorobenzylamino | NIS | 3-(m-fluorobenzylamino)-2-iodo-5,5-dimethyl |
| 24 | $C_2H_5$ | o-Fluorobenzylamino | NClS | 2-chloro-5,5-diethyl-3-(o-fluorobenzylamino) |
| 25 | n-$C_3H_7$ | m-Iodobenzylamino | NIS | 2-iodo-3-(m-iodobenzylamino)-5,5-dipropyl |
| 26 | H | m-(Trifluoromethyl)benzylamino | NBS | 2-bromo-3-[m-(trifluoromethyl)benzylamino] |
| 27 | $CH_3$ | do | NIS | 2-iodo-5,5-dimethyl-3-[m-(trifluorormethyl)benzylamino] |
| 28 | $C_2H_5$ | o-(Trifluoromethyl)benzylamino | NClS | 2-chloro-5,5-diethyl-3-[o-(trifluoromethyl)benzylamino] |
| 29 | n-$C_3H_7$ | do | NClS | 2-chloro-5,5-dipropyl-3-[o-(trifluoromethyl)benzylamino] |
| 30 | H | (3-furylmethyl)amino | NBS | 2-bromo-3-[(3-furylmethyl)amino] |
| 31 | $CH_3$ | do | NClS | 2-chloro-3-[(3-furylmethyl)amino]-5,5-dimethyl |
| 32 | $C_2H_5$ | Furfurylamino | NBA | 2-bromo-5,5-diethyl-3-furfurylamino |
| 33 | n-$C_3H_7$ | do | NIS | 3-furfurylamino-2-iodo-5,5-dipropyl |
| 34 | H | Phenethylamino | NBA | 2-bromo-3-phenethylamino |
| 35 | $CH_3$ | do | NIS | 5,5-dimethyl-2-iodo-3-phenethylamino |
| 36 | $C_2H_5$ | do | NClS | 2-chloro-5,5-diethyl-3-phenethylamino |
| 37 | n-$C_3H_7$ | do | NIS | 2-iodo-3-phenethylamino-5,5-dipropyl |

*See footnote end of table.

TABLE I—Continued

| Example | Starting material of Formula II R₁ and R₂ | Y | Halogenating reagent* | Product: (prefix listed below)-2-cyclohexen-1-one |
|---|---|---|---|---|
| 38 | H | p-Chlorophenethylamino | NBA | 2-bromo-3-(p-chlorophenethylamino) |
| 39 | CH₃ | o-Bromophenethylamino | NClS | 3-(o-bromophenethylamino)-2-chloro-5,5-dimethyl |
| 40 | C₂H₅ | p-Bromophenethylamino | NBA | 2-bromo-3-(p-bromophenethylamino)-5,5-diethyl |
| 41 | n-C₃H₇ | m-Chlorophenethylamino | NIS | 3-(m-chlorophenethylamino)-2-iodo-5,5-dipropyl |
| 42 | H | p-(Trifluoromethyl)phenethylamino | NIS | 2-iodo-3-[p-(trifluoromethyl)phenethylamino] |
| 43 | CH₃ | ----do---- | NClS | 2-chloro-5,5-dimethyl-3-[p-(trifluoromethyl)phenethylamino] |
| 44 | C₂H₅ | m-(Trifluoromethyl)phenethylamino | NBA | 2-bromo-5,5-diethyl-3-[p-(trifluoromethyl)phenethylamino] |
| 45 | n-C₃H₇ | ----do---- | NBS | 2-bromo-5,5-dipropyl-3-[p-(trifluoromethyl)phenethylamino] |
| 46 | H | (2-furylethyl)amino | NBS | 2-bromo-3-[(2-furylethyl)amino] |
| 47 | CH₃ | ----do---- | NIS | 3-[(2-furylethyl)amino]-2-iodo-5,5-dimethyl |
| 48 | C₂H₅ | ----do---- | NClS | 2-chloro-5,5-diethyl-3-[(3-furylethyl)amino] |
| 49 | n-C₃H₇ | ----do---- | NBA | 2-bromo-3-[(3-furylethyl)amino]-5,5-dipropyl |

*NBS=N-bromosuccinimide; NIS=N-iodosuccinimide; NClS=N-chlorosuccinimide; NBA=N-bromoacetamide.

EXAMPLE 50

3-Benzylamino-2-bromo-5,5-dimethyl-2-cyclohexen-1-one (I: R¹ and R²=CH₂, X=Br and Y=benzylamino)

The starting material of formula II, 3-benzylamino-5,5-dimethyl-2-cyclohexen-1-one (3.5 g.), described by P. Crabbe et al., cited above, is dissolved in 80 ml. of chloroform and a solution of 2.7 g. of bromine in 30 ml. of chloroform is added to it in portions over a period of 5–10 min. Discoloration of bromine solution is rapid and the reaction is slightly exothermic. The reaction mixture is left overnight at room temperature. Absolute ether (50 ml.) is added to complete the precipitation of solid from the reaction mixture. The solid is collected and recrystallized from ethanol to afford the title compound, m.p. 183–184° C., $\gamma_{max}^{CHCl_3}$ 3350, 1565 cm.⁻¹.

Alternatively, by disolving the solid in cold sulfuric acid (−10° to 10° C.) and after 5 min. at that temperature, pouring the solution onto ice and extracting the resulting mixture with chloroform, the title compound is also obtained after separation and evaporation of the chloroform.

The title compound is also obtained by treating 3-benzylamino - 5,5 - dimethyl-2-cyclohexen-1-one with 1.5 molar equivalents of cyanogen bromide in boiling ethanol. In this case the title compound precipitates from the reaction mixture and is collected by filtration.

EXAMPLE 51

3-Benzylamino-5,5-dimethyl-2-iodo-2-cyclohexen-1-one (I: R¹ and R²=CH₃, X=I and Y=benzylamino)

The starting material of formula II, 3-benzylamino-5,5-dimethyl-2-cyclohexen-1-one (2.29 g.), see Crabbe, cited above, is dissolved in 60 ml. of chloroform. A solution of 2.54 g. of iodine in 100 ml. of chloroform is added in portions. The reaction mixture is stirred for 3 hr. at room temperature, then washed with 30% sodium thiosulfate solution and 10% sodium bicarbonate solution, water, saturated brine solution and dried (MgSO₄). After filtration the colorless organic layer is concentrated. The residue is crystallized from aqueous methanol to give the title compound, m.p. 153–154° C., $\gamma_{max}^{CHCl_3}$ 3340, 1630, 1560 cm.⁻¹.

By following the procedure of Examples 50 or 51 and using an appropriate starting material of formula II, for example, those described in Examples 18 to 49, together with the appropriate halogenating agent selected from bromine, chlorine, and iodine, or the interhalogen compounds, for instance, see T. Moeller, "Inorganic Chemistry," John Wiley & Sons, Inc., New York, 1952, pp. 444–453, then the corresponding enaminoketones of formula I in which Y is NH(CH₂)ₙR³ in which n is the integer 1 or 2 and R³ is as defined in the first instance, for example, the products of Examples 18 to 49, are obtained.

EXAMPLE 52

3-Amino-2-bromo-5,5-dimethyl-2-cyclohexen-1-one (I: R¹ and R²=CH₃, X=Br and Y=NH₂)

3 - Benzylamino-2-bromo-5,5-dimethyl-2-cyclohexen-1-one (0.5 g.), described in Example 50, is dissolved in 10 ml. of concentrated sulfuric acid and the solution heated at 65° for 90 min. The reaction mixture is poured on cracked ice and extracted with chloroform. The organic phase is washed with a solution of sodium bicarbonate, dried over sodium sulfate, filtered, and evaporated. The residue is crystallized from ethyl acetate to give the title compound, m.p. 204–206° C., nmr (DMSO-d₆) δ 0.99 (s, 6H), 2.22 and 2.43 (two s, 2H and 2H), 7.00 (broad, 2H).

In the same manner but replacing 3-benzylamino-2-bromo-5,5-dimethyl-2-cyclohexen-1-one with an equivalent amount of 3-benzyl-2-iodo-2-cyclohexen-1-one, described in Example 18, 3-benzylamino-2-chloro-5,5-dimethyl-2-cyclohexen-1-one, described in Example 19, 3-benzylamino - 2 - bromo - 5,5-diethyl-2-cyclohexen-1-one, described in Example 20, or 3-benzylamino-2-bromo-5,5-dipropyl-2-cyclohexen-1-one, described in Example 21, then 3 - amino - 2-iodo-2-cyclohexen-1-one, 3-amino-2-chloro-5,5 - dimethyl-2-cyclohexen-1-one, 3-amino-2-bromo-5,5-diethyl-2-cyclohexen-1-one, and 3-amino-2-bromo-5,5-dipropyl-2-cyclohexen-1-one are obtained, respectively.

I claim:

1. A compound of the formula

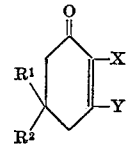

in which R¹ and R² both are hydrogen or lower alkyl; X is selected from the group consisting of chlorine, bromine and iodine; and Y is —NHR³ and R³ is

in which Z is hydrogen, halo or trifluoromethyl.

2. 2 - Bromo - 3-(α,α,α-trifluoro-m-toluidino)-2-cyclohexen-1-one, as claimed in Claim 1.

References Cited

Crabbe et al., "Tetrahedron," vol. 24, p. 4299 (1968).

ROBERT V. HINES, Primary Examiner

S. P. WILLIAMS, Assistant Examiner

U.S. Cl. X.R.

252—8.8, 106; 260—347.7, 244 (R), 563, 570.8, 570.9, 586 (R); 424—330